(12) United States Patent
Ball et al.

(10) Patent No.: US 8,805,922 B2
(45) Date of Patent: Aug. 12, 2014

(54) SYSTEM AND METHOD FOR NEGOTIATING A NETWORK CONNECTION

(76) Inventors: Stephen Ball, Stamford, CT (US); Kathleen Chapman, Bay Saint Louis, MS (US); Curtis J. Spacht, Bay Saint Louis, MS (US)

(*) Notice: Subject to any disclaimer, the term of this patent is extended or adjusted under 35 U.S.C. 154(b) by 210 days.

(21) Appl. No.: 13/108,817

(22) Filed: May 16, 2011

(65) Prior Publication Data
US 2011/0282928 A1 Nov. 17, 2011

Related U.S. Application Data

(60) Provisional application No. 61/345,059, filed on May 14, 2010.

(51) Int. Cl.
*G06F 15/16* (2006.01)
(52) U.S. Cl.
USPC ........................................................ 709/202

(58) Field of Classification Search
USPC ......... 709/202, 203, 206, 218, 225, 226, 229, 709/232
See application file for complete search history.

(56) References Cited

U.S. PATENT DOCUMENTS

| | | | |
|---|---|---|---|
| 7,042,851 B1 | 5/2006 | Rahman et al. | |
| 7,463,604 B2 | 12/2008 | Zellner et al. | |
| 8,326,958 B1 * | 12/2012 | Raleigh | 709/223 |
| 2004/0143509 A1 * | 7/2004 | De Almeida Prado et al. | 705/26 |
| 2004/0186902 A1 | 9/2004 | Stewart | |
| 2009/0082019 A1 | 3/2009 | Marsico | |
| 2009/0198608 A1 | 8/2009 | Jain et al. | |

* cited by examiner

*Primary Examiner* — Mark Rinehart
*Assistant Examiner* — Ellen A Kirillova
(74) *Attorney, Agent, or Firm* — St. Onge Steward Johnston & Reens LLC

(57) ABSTRACT

A system and method for automatically negotiating Internet access between a user and one of a plurality of Internet connection providers.

17 Claims, 6 Drawing Sheets

SYSTEM AND METHOD FOR NEGOTIATING A NETWORK CONNECTION

CROSS-REFERENCE TO RELATED APPLICATIONS

This patent application claims the benefit, under 35 U.S.C. §119(e), of U.S. Provisional Patent Application Ser. No. 61/345,059, filed on May 14, 2010, the content of which is incorporated herein by reference in its entirety.

BACKGROUND OF THE INVENTION

The present teachings relate generally to automated services negotiation and, more particularly, to the selection of Internet connections. Currently, disparate Internet service providers provide Internet access on a soft-wired basis in which the subscriber executes a contract with the provider and the provider provides Internet services to the subscriber. Further, Internet access can be gained by selective use of wireless devices, for example, WIFI available in a library or in the next apartment. WIFI devices can be secured or unsecured, and users can attempt to access either by a secure protocol such as a username and password, or simply by selecting the WIFI device if it is not secured.

What is needed is a system whereby a computer stores information on network services provided by network providers, and in which the network user only pays for the needed resource (e.g., time, bandwidth, etc.). What is further needed is a system that maximizes value of network resources in which the network provider can charge a rate that is dependent on network volume, for example, and unused bandwidth can be sold as a new income stream. What is further needed is a system in which the network user gets the benefit of lowest priced available bandwidth, and can take advantage of an increasing number of available networks. What is still further needed is a system that can automatically negotiate the use of appropriate networks and settle payment, and in which the network user has network provider neutrality, as well as the ability to support pre-paid accounts for devices such as VoIP phones and single use devices, for example, emergency beacons.

SUMMARY OF THE INVENTION

The needs set forth herein as well as further and other needs and advantages are addressed by the present embodiments, which illustrate solutions and advantages described below.

In one embodiment, the system and method of the present embodiment allow a user to buy or bid for Internet bandwidth, for example, through a server or website or by direct communications with an Internet access point such as, for example, a WIFI access point. A "clearinghouse" server, although not limited thereto, may maintain account information (e.g., account identification number, etc.) so that the user would not have to supply this information for each access, or the access point could request the account information from the user/user computer for each use. In addition, the access point could request account information from the clearinghouse server and provide access to the user if the user's account included sufficient required information and funds. In any case, a determination could be made concerning the user's preferred service metrics, for example, but not limited to, the amount the user is willing to pay for the service, the bandwidth required by the user, the amount of time the user needs to access the Internet, and the quality of service required. If the prospective provider satisfies the user's service metrics, the prospective provider may communicate to the user the metrics, including the cost, for the required services (e.g., "provider service outline", etc.). The user may select from the possible prospective providers based on the costs and benefits of the prospective providers. Preferably, the user's device could broadcast a connection request to multiple networks and negotiate with all of them simultaneously for the lowest rate, similar to a reverse auction.

In one embodiment, the system for negotiating a computer network connection for the benefit of a network user computer can include, but is not limited to including, one or more network provider computers configured to provide to the user computer access to one or more computer networks. Each provider computer may be associated with a provider service outline. The system may further include a negotiation processor accessing one or more service provider outlines and selecting a network provider computer using a requested service outline and a provider service outline. The system can still further include a network access interface that can enable the computer network connection for the benefit of the user computer provided by the selected network provider computer. The system can optionally include a server computer receiving the requested service outline (e.g., from the user computer, etc.). The network provider computers can be communicatively coupled with the server computer, and can provide provider service outlines to the server computer. The network provider computer can optionally be a router. The user computer can optionally be a mobile device. The computer network can optionally be the Internet. The requested service outline can include, but is not limited to including, account information having a prepaid payment amount, requested bandwidth, requested connection time, and requested network reliability. The system can optionally include a user interface for managing the requested service outlines, and the user interface can be a webpage.

In another embodiment, the method for negotiating, by a server computer, a computer network connection provided by a selected network provider for the benefit of a user computer can include, but is not limited to including, the steps of receiving, by the server computer, a network connection preference from the network user computer, sending, by the server computer, an offer for a network connection, the offer having a service outline, accepting (e.g., by the server computer, provider computer, etc.), payment account information based on the service outline, and providing, by the server computer, network service information about the selected network provider to enable the computer network connection for the network user computer. The method can optionally include the steps of determining, by the server computer, the selected network provider based on one or more of bandwidth, time, quality and price of one or more network providers, determining (e.g., by the server computer, provider computer, etc.) if the network connection has expired, and discontinuing the network connection if the network connection has expired. One or more computer processors executing computer software code stored on computer readable media can execute the previously described steps, although not limited thereto. It is to be appreciated that any of the steps or functionality described herein may be performed on one or more of the various disclosed computers and the present teachings are not limited to any particular embodiment.

In yet another embodiment, the method for negotiating a computer network connection provided by a selected network provider for the benefit of a network user computer can include, but is not limited to including, the steps of receiving, by at least one provider processor associated with at least one network provider, a network connection preference from the network user computer, sending, by the at least one provider processor, an offer for a network connection, the offer having a service outline, accepting, by the at least one provider processor, payment account information based on the service outline, and enabling, by the at least one provider processor, the computer network connection for the network user computer. The method can optionally include the steps of supplying, by the at least one provider processor, one or more of bandwidth, time, quality and price of the at least one network provider's service, determining, by the at least one provider processor, if the computer network connection has expired, and discontinuing, by the at least one provider processor, the network connection if the network connection has expired. One or more computer processors executing computer software code stored on computer readable media can execute the previously described steps, although not limited thereto.

In a still further embodiment, the system for negotiating use of a network connection can include, but is not limited to including, a network user device having requesting software executing on computer readable medium, and a plurality of network provider devices having approving software executing on computer readable medium. The requesting software may send a network connection request to the plurality of network provider devices, and one of the plurality of network providers may provide a network connection to the network user device based at least in part on the price that the network user device is willing to pay for the network connection. The one of the plurality of network providers can be paid for that network connection. The network can be wireless, although not limited thereto, and the network user device can provide requirements (e.g., time, quality, size, price, etc.). In one embodiment, the network provider can determine price based on network use. The network provider can be a router, and the network user can be a mobile device, for example. In such a way, the network user can be network provider-independent. The plurality of network providers can bid against each other, and the network user can prepay for network use. The network user can re-broadcast the lowest bid to elicit further bids, and the network user can send payment information to the network provider. An auction such as a reverse auction can be used to assist in negotiation, as well as a Dutch auction, although not limited thereto. The server can also send payment information and store network user preferences.

In another embodiment, the system for establishing network services can include, but is not limited to including, a user processor and a provider processor. Optionally, the system can include a server. The user processor can include, but is not limited to, a requirements processor for receiving service metrics from a user and providing them to a network provider, for example, through a server or through a provider interface such as a wireless device. The user processor can also include a negotiation processor for receiving and processing information from potential providers and providing account information to the potential providers. The user processor can even further include a payment processor for managing payment for network services and a service interruption processor for managing termination of services. The user processor can also include a network access interface to couple the user processor with existing hardware and software that manages other aspects of the network connection. The provider processor can include, but is not limited to including, a requirements comparer for determining if the provider can satisfy the service metrics provided by the user processor. The provider processor can also include a response processor that can provide a counteroffer to the user processor that specifies the metrics that most closely match the user service metrics. The provider processor can also include a revenue processor for receiving payment and/or account information if the user processor selects the provider for Internet access, and an expiration processor for managing termination of the Internet connection. Alternatively, or in addition, the system of the present embodiment can include a server for receiving and storing user account information, for managing the handshaking stated above for several Internet providers and/or access points, and for settling payment between the user and provider.

In yet another embodiment, the method for establishing network services by a user processor can include, but is not limited to including, the steps of (a) sending, from a network user computer, requirements to a network provider computer for the network services; (b) receiving, in the network user computer, a service metric from the network provider computer based on the requirements; (c) rendering or agreeing on payment, from the network user computer, to the network provider computer for the network services if the service metric is acceptable to the network user computer; (d) determining, by the network user computer, if a counteroffer is acceptable if the service metric includes a counteroffer; (e) selecting, by the network user computer, another network provider computer if the service metric is a rejection; (f) repeating, by the network user computer, steps (a)-(e) if the service metric is a rejection; and (g) using, by the network user computer, the network services. The method can optionally include the steps of selecting the network services from a group consisting of, although not limited thereto, quality of service, bandwidth, time, and price, determining if the network services have been terminated, and discontinuing the step of rendering the network services if the network services have been terminated.

In a still further embodiment, the method for establishing network services by a provider processor can include, but is not limited to including, the steps of receiving, in a network provider computer, requirements from a network user computer; determining, by the network provider computer, a service metric based on the requirements; sending, by the network provider computer, the service metric to the network user computer; receiving, in the network provider computer, a counteroffer from the network user computer; determining, by the network provider computer, sufficiency of the counteroffer; sending, by the network provider computer, a response to the counteroffer to the network user computer based on the sufficiency; receiving, by the network provider computer, payment or a promise to pay for the network services from the network user computer; and providing, by the network provider computer, the network services to the network user computer.

Other embodiments of the system and method are described in detail below and are also part of the present teachings.

For a better understanding of the present embodiments, together with other and further aspects thereof, reference is made to the accompanying drawings and detailed description, and its scope will be pointed out in the appended claims.

DETAILED DESCRIPTION OF THE INVENTION

The present teachings are described more fully hereinafter with reference to the accompanying drawings, in which the present embodiments are shown. The following description is presented for illustrative purposes only and the present teachings should not be limited to these embodiments. Any computer configuration and architecture satisfying, the speed and interface requirements herein described may be suitable for implementing the system and method of the present embodiments.

Known systems may be improved by allowing a user or subscriber to select an Internet service provider or WIFI access point based on the best value available at the time the service is needed. Internet service providers and WIFI access points could thus compete for user/subscriber revenue by providing service metrics that solve the user/subscriber's dynamic Internet needs. In addition, disposable or emergency products that are network-enabled for example, a single-use emergency beacon, could benefit from such a service.

Figure 1:
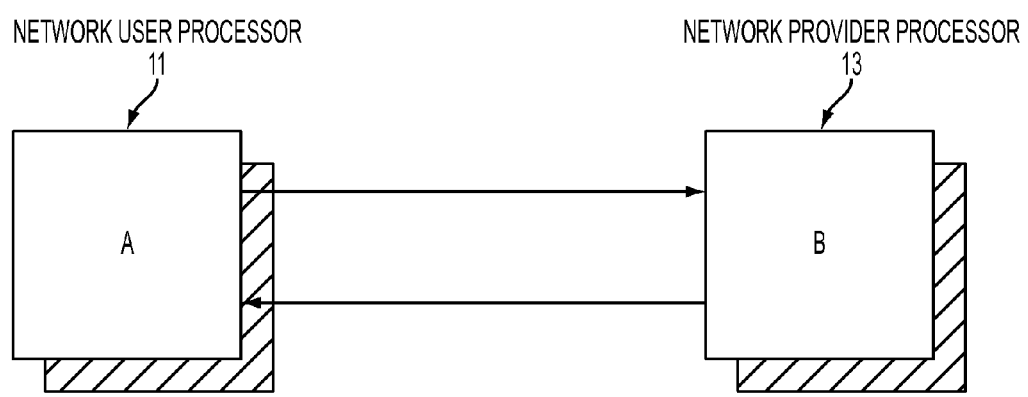
FIG. 1 is a schematic block diagram of a negotiated network of the present embodiment.

Referring now to FIG. 1, A is network user such as, for example, but not limited to, a computer (e.g., "user computer," etc.), a mobile device, or a local network provider, while B is a network provider (e.g., network access point, etc.) such as, for example, but not limited to, a router or a gateway to network. A can broadcast need/requirements such as, for example, but not limited to, quality, bandwidth, time, and price, either wirelessly or over a wired connection, although not limited thereto. B can accept, reject, or counter-offer. A can render payment such as, for example, but not limited to, by credit card or account credentials, which may be provided in a website, although not limited thereto.

In this way, network user A can negotiate a connection to a network (e.g., the Internet, etc.) without regard to service provider. In one embodiment, A polls network provider B with a request for a network connection. A may provide to B an amount it is willing to pay for a connection measured in length of time of the connection, bandwidth (e.g., amount of data transfer), etc. A may also provide minimum requirements for the connection such as, for example, a minimum connection speed of 10 Mbit/s. It is to be appreciated that not every network user will have the same minimum network requirements for each connection. In some circumstances, for example, a single-use device, discussed further below, may only need enough bandwidth to transmit a short, single, pre-determined message, although not limited thereto.

Network provider B may receive A's request and determine it can be accommodated. This may be based on B's current network use. At certain times of the day, for example, B may have low network use by its users. In this case, it may be preferable to attempt to sell as many Internet connections or as much bandwidth as it can in order to maximize its own network connection and, thus, maximize potential income. Therefore, B may accept requests offering relatively low payment. At other times of the day, however, network provider B may have high demand by its users for network connections. B's availability may be determined by the current number of connections, the current network traffic as measured by a router's current transfer rate, or predetermined times of days and days of the week, for example, although not limited thereto. During times of high network use, B may reject requests for network connections from A having relatively lower offer price. B may also supply a counter-offer to A requiring a higher price (or lower connection quality, etc.) for the requested network connection when network use is high. This negotiation may go back and forth. The system described herein values network connections based in part on supply and demand and the system may store the preferred ranges as well as maximum/minimum ranges that each party is willing to accept, although not limited thereto.

Once A and B agree on a network connection (e.g., based at least in part on price, connection requirements, time/bandwidth, etc.), for example, although not limited thereto, B may accept A's connection request so that A may start using the network. A may transmit to B payment information such as credit card, ACH, account credentials such as, for example, although not limited thereto, PayPal or a clearinghouse server according to the present teachings, discussed further below. In one embodiment, payment information may be stored by the system on a website accessible by the user. B may wait until A's payment "clears" before allowing A's network traffic to enter the network, although, not limited thereto. In one alternative, an independent service may verify A's credit (e.g., may have balance in system account, etc), although not limited thereto. B may then periodically monitor A's network use and terminate its network connection once A's paid-for use is exhausted. In one embodiment, although not limited thereto, B may automatically renew A's connection request when exhausted based upon pre-negotiated terms.

It is to be appreciated that network user A is not necessarily an end-user, but may instead be a network provider itself. In this way, it is evident that A may take advantage of favorable network connection rates provided by B and "resell" connections to other network users for a profit.

Figure 2:
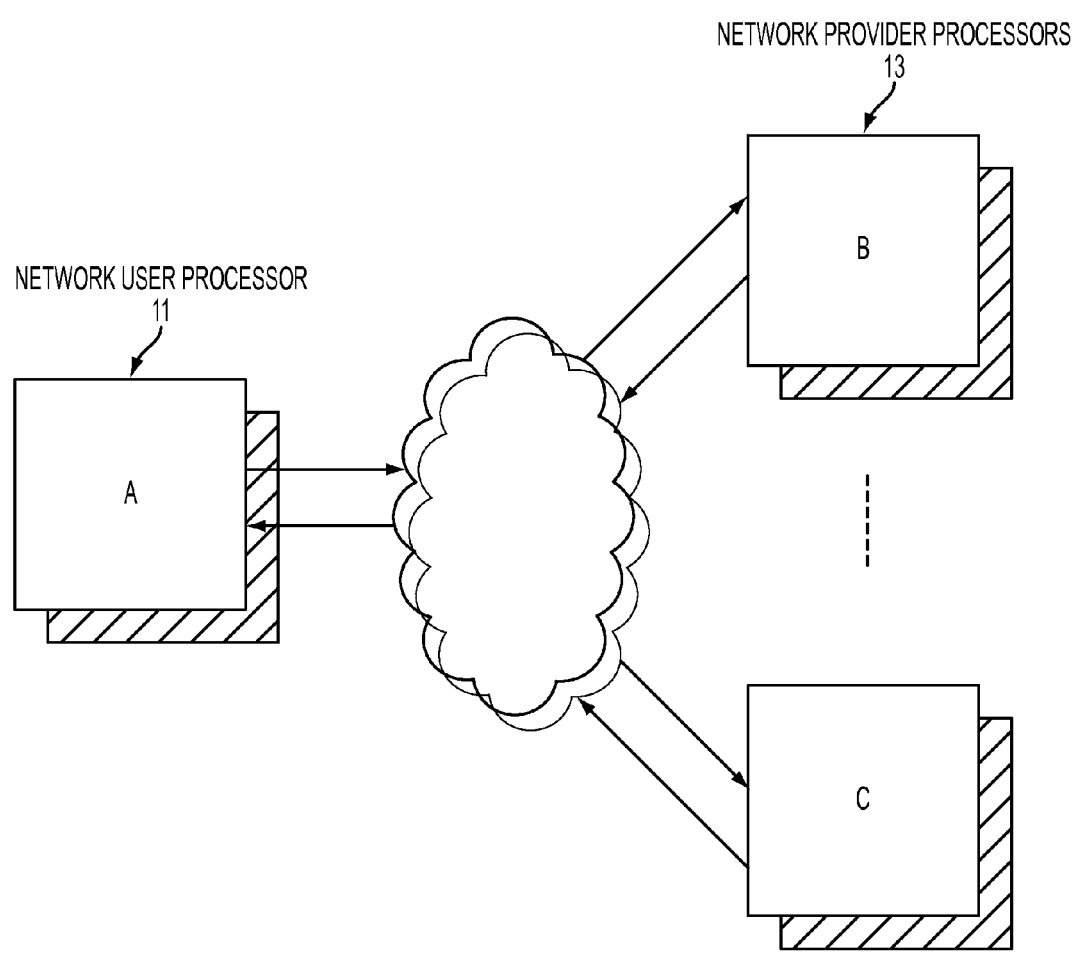
FIG. 2 is a schematic block diagram according to FIG. 1 depicting multiple network providers using an auction network.

Referring now to FIG. 2, A can broadcast need/requirements such as, for example, but not limited to quality, bandwidth, time and price. B and C can provide bids in response to the requirements of A. A can render payment such as, for example, but not limited to, by credit card or website account credentials. A can offer a relatively low price and gradually increase it in predetermined increments, although not limited thereto, and/or B and C can place relatively high bids and gradually decrease. A can broadcast a last bid offer to elicit further bids.

In one embodiment, A may broadcast its network connection request to multiple network providers (e.g., B and C, etc.). When multiple network providers are competing for providing a network connection to A, A benefits from competitive pricing. B and C may therefore be willing to accept lower prices for the requested network connection in order to maximize the potential income of unused network resources. If one of the network providers indicates that it will accept A's request, A may choose to broadcast another request with that price to the multiple network providers in order to try to solicit an even more favorable price. In the alternative, a network provider may respond to A's request indicating that it is willing to accept a lower price. One objective of the present teachings is that A should get the best valued network connection while network providers are turning unused network bandwidth into income.

It is to be appreciated that the back and forth negotiation may be accomplished without manual user input. For example, the negotiation may be accomplished automatically based on information previously provided to the system by the user and/or network provider. In another embodiment, the parties may be required to manually approve any offer and/or acceptance, although not limited thereto.

Figure 3:
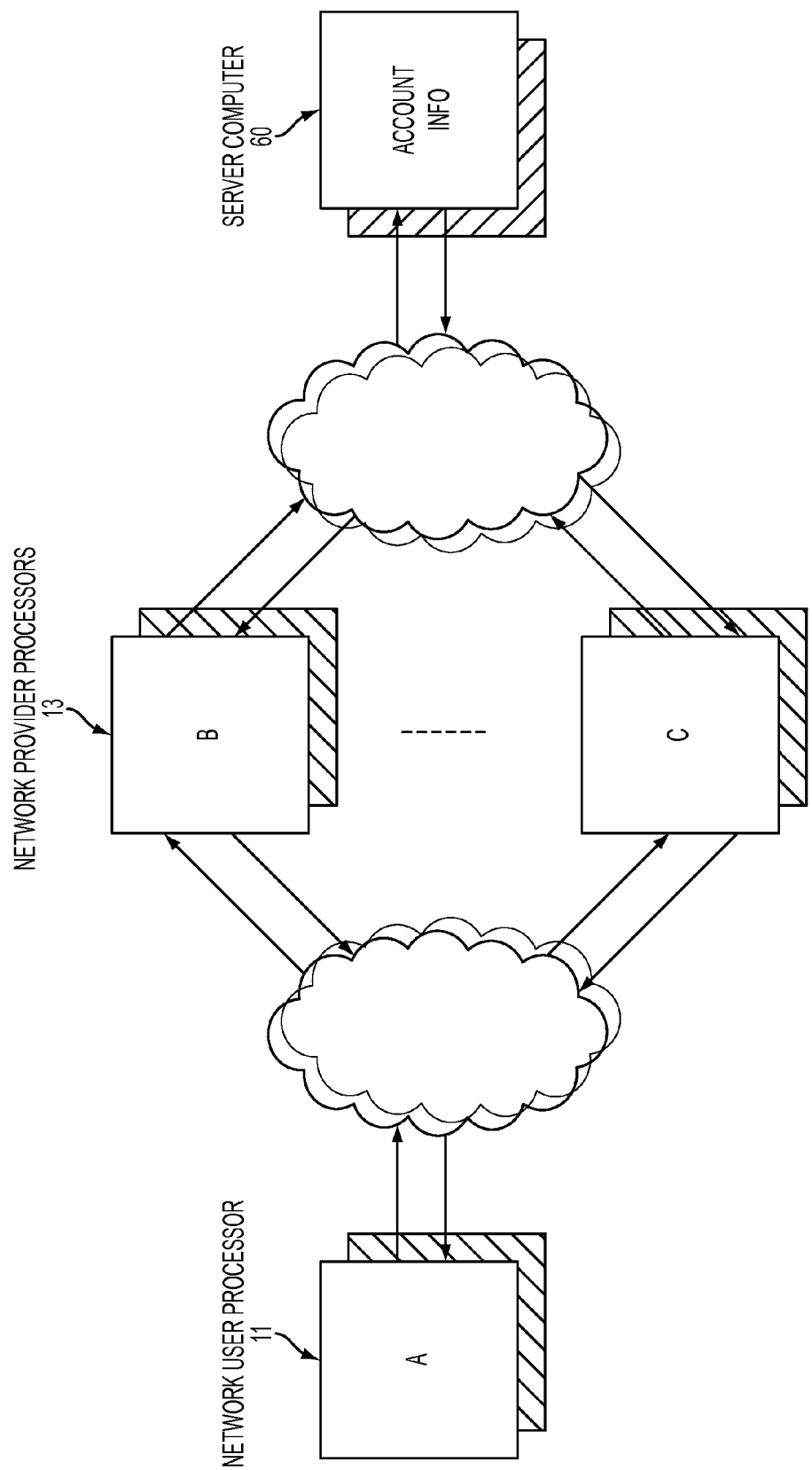
FIG. 3 is a schematic block diagram according to FIG. 1 depicting a server.
Figure 6:
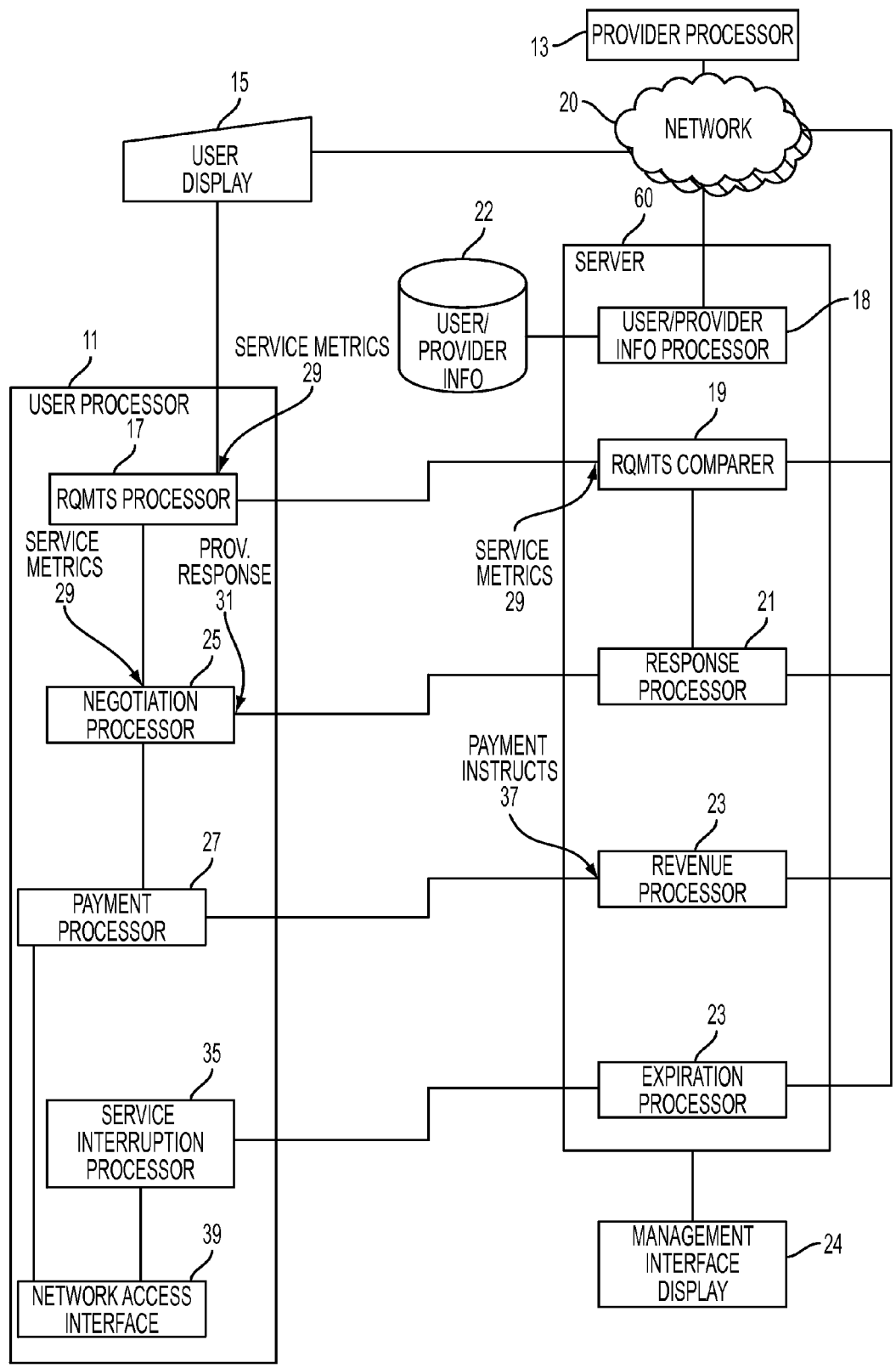
FIG. 6 is a schematic block diagram according to FIG. 1 depicting an alternative embodiment of the architecture having a server.

Referring now to FIGS. 3 and 6, A (network user 11) may broadcast a unique identifier that relates to its account information on server 60. Such an identifier may be a media access control address assigned to A's network interface card, or some other unique identifier assigned by server 60, although not limited thereto. B and C can negotiate with server 60 for bandwidth based on account preferences. The winner (e.g., either B or C, etc.) can accept the offer of A. Server 60 can render payment such as, for example, but not limited to, by credit card or other account credentials, which can provide enhanced security and less processing for A. In one embodiment, although not limited thereto, server 60 can hold a Dutch auction. In another embodiment, if there is no browser on a network-enabled device, another computer, for example, a personal computer can be used to manage access and other information such as through a website.

In one embodiment, network user A may have an account with server 60. Server 60 may store and process, for example, in user/provider information processor 18 (FIG. 6), various preferences of A's including, although not limited thereto, payment information and network connection preferences (e.g., minimal connection needs such as time, price willing to pay, quality of connection, bandwidth, etc.). This way, A may only need to broadcast a unique identifier to all, network providers B, C, etc. The network providers may then inquire with server 60 about A's predetermined needs. Server 60 may act as the negotiator to acquire for A a favorable network connection from provider processor 13 (FIG. 6) according to its preferences. In this way, server 60 may communicate back and forth with the network providers who bid for the requested network connection.

When the network providers have accounts on server 60, server 60 can also act as a clearinghouse to settle any payment. This may be preferable to using credit card information, for example, since it is not only a closed, more secure system (e.g., no need to transmit confidential credit card information, payment can be settled faster based on the parties' respective account balances. For example, if A has an account balance of X (e.g., prepaid, etc.), server 60 may automatically settle any payments less than X since the network providers may be more willing to trust server 60. Payment may be immediately transferred from a user's account to a provider's account, although not limited thereto. In one alternative, if A has given its credit card information to server 60 and instructed server 60 to automatically settle payments less than Y, server 60 can do so quickly, before it actually charges A's credit card. In this way, payment is settled quickly so that A can quickly obtain a network connection. In this way, it is also possible that disposable devices may have prepaid accounts balances that, for example, include the devices ability to connect to a network and up to that prepaid account balance, although not limited thereto.

Server 60 may also store in user/provider info 22 (FIG. 6), for example, independent rating information for each network provider. In this way, network users can report actual network reliability (e.g., bandwidth, transmissions rate, latency, uptime, etc.) for each network provider to server 60. This information may be provided manually or automatically. Server 60 may use this information in its negotiation with network providers in order to assure that A receives a network connection that satisfies its needs (e.g., the best connection at the best value, etc.). It is appreciated that network providers may try to offer network capabilities that they are not able to provide (e.g., favorable transfer rates, etc.). As the network user uses a network connection, it can report its use and any issues (e.g., latency, lost packages, etc.) to server 60 so that server 60 will know in the future whether the network provider is able to actually deliver on its promises.

Figure 4:
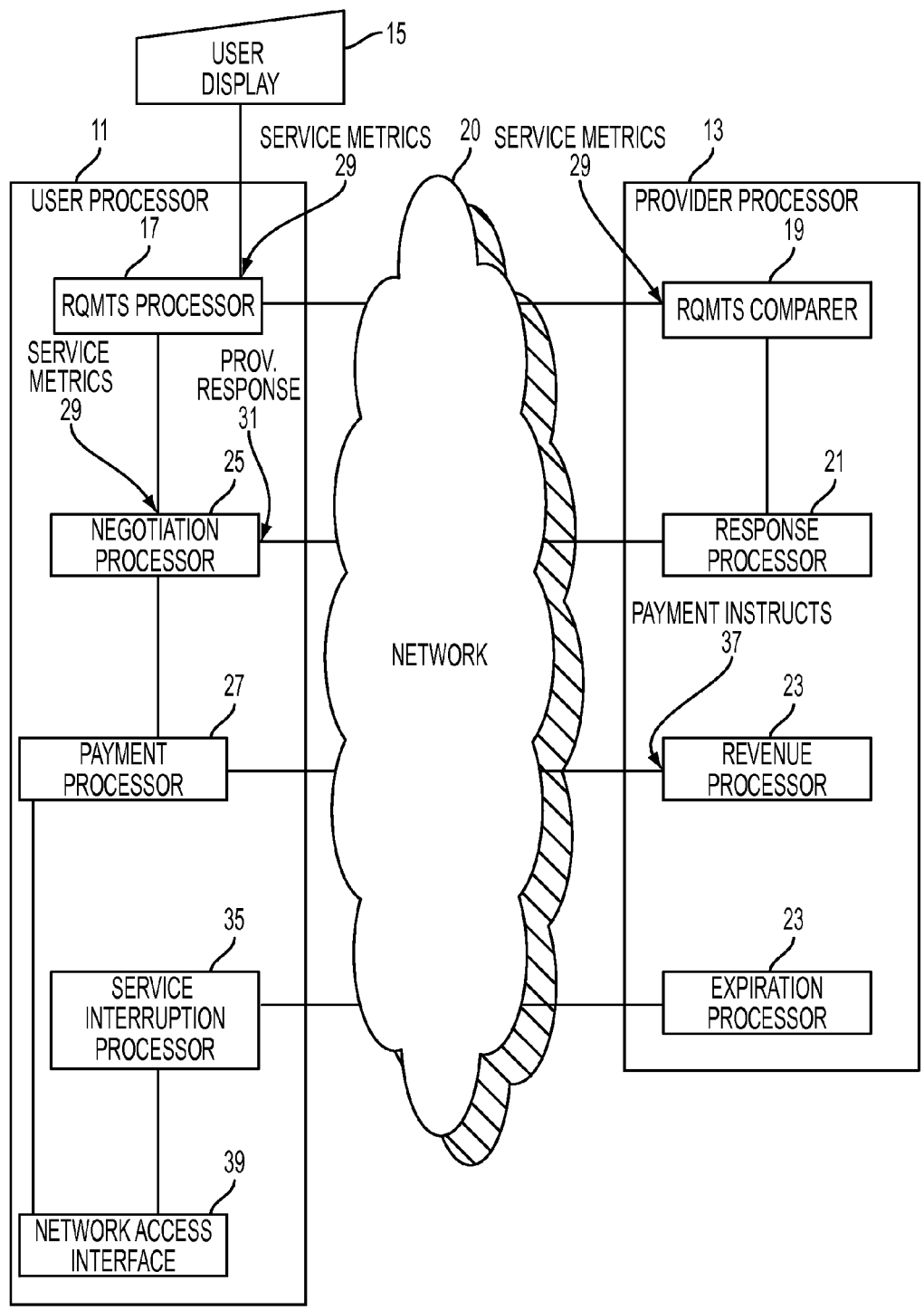
FIG. 4 is a schematic block diagram according to FIG. 1 depicting one embodiment of the computer architecture.

Referring now to FIG. 4, shown is a schematic block diagram of the architecture of an embodiment of the present teachings in which user processor 11 interfaces directly with a selected provider processor, exemplarily shown as provider processor 13. User processor 11 may comprise several elements and additional processors including, although not limited thereto, a requirements processor 17, a negotiation processor 25, a payment processor 27, a service interrupter processor 35, and a network access interface 39. Each provider processor 13 may comprise several elements and additional processors including, although not limited thereto, a requirements comparer 19, a response processor 21, and expiration processor 23, and a revenue processor 23.

In action, the user requirements processor 17 may first "poll" available network providers by sending its requirements (e.g., preferences, etc.), service metrics 29, to the network providers' provider processor 13, specifically to respective requirements comparers 19. The requirements comparers 19 may determine whether the network provider has the availability to accommodate the user's network connection request for the offered price. The network providers' response processors 21 may then indicate that availability (e.g., willingness to offer network connection), the provider response 31, to the user's negotiation processor 25. If one of the network providers' response (e.g., may include counter-offer) is adequate, the user's payment processor 27 may transmit payment instructions 37 to the revenue processor 23 of the accepted (e.g., "winning", etc.) network provider. The user may then access the network 20 through its network access interface 39 and provider processor 13. Once the negotiated network connection expires (e.g., paid-for time, bandwidth exceeded, etc.), the network provider's expiration processor 23 may cancel the network connection or communicate with the user's service interruption processor 35 that the network connection will be closed. At this point, the parties may renegotiate a new network connection or automatically renew the network connection based on previously-negotiated terms.

Figure 5:
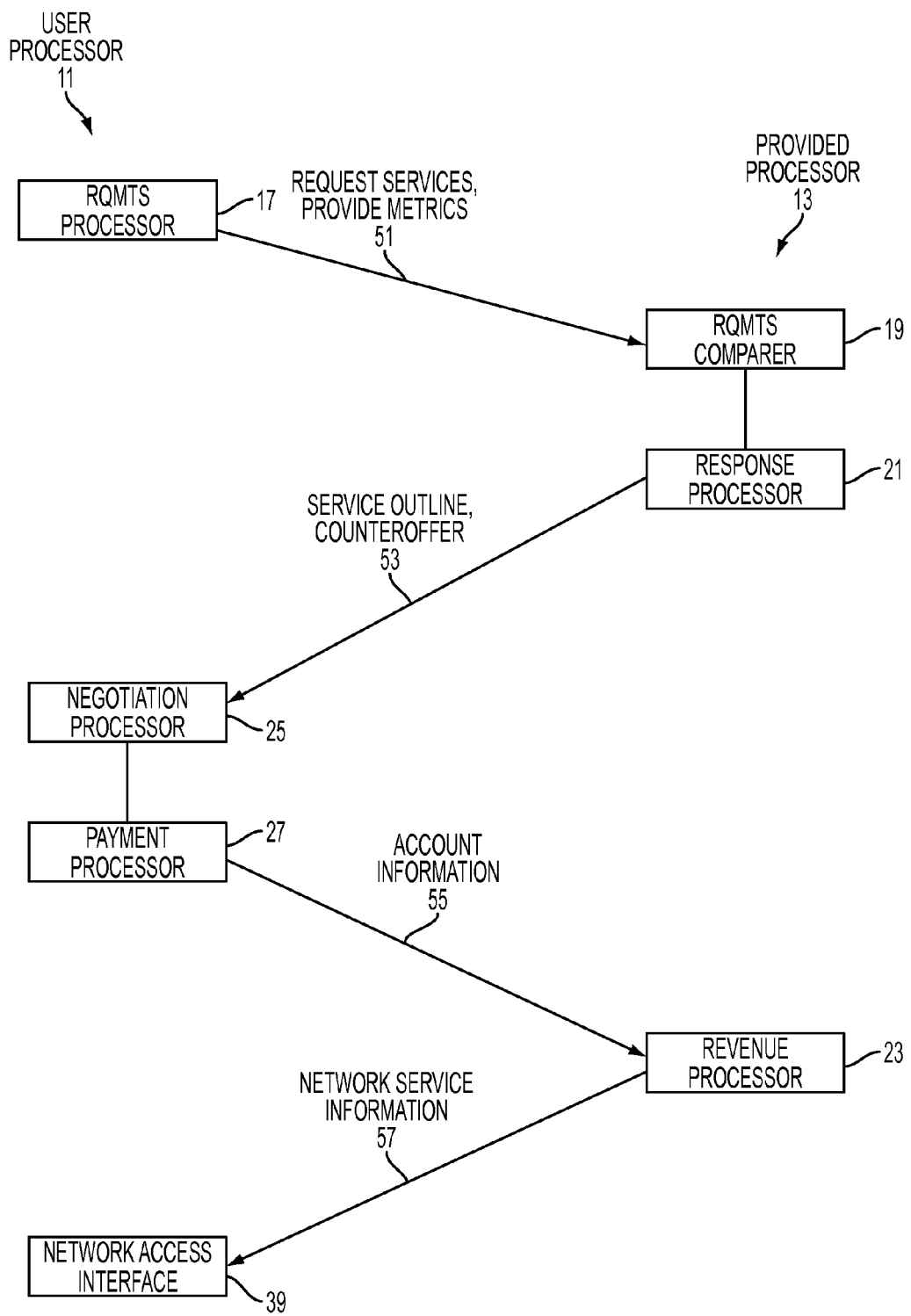
FIG. 5 is a data flow diagram according to FIG. 1.

Referring now to FIG. 5, shown is a data flow diagram of the embodiment of the present teachings. The user processor 11 requirements processor 17 may request service 51 from the provider processor 13 requirements comparer 19. The provider processor 13 response processor 21 may then return a service outline/counter-offer 53 to negotiation processor 25. Payment processor 27 may then accept by sending account information 55 (e.g., payment info) to provider processor 13 revenue processor 23. Then network service information 57 may be sent to user network access interface 39 so that user processor 11 may enable the user to start using the network.

It is appreciated the system of the present teachings may run on several pieces of software (e.g., user processors, provider processors, and server processors, etc.) and on several pieces of hardware, although not limited thereto. In one embodiment, the user processors may be designed as a downloadable application for a mobile device (e.g., iPhone App, etc.) in order to negotiate a network connection. In this way, the system may provide a user interface with available network connections and their respective prices, bandwidth, etc. The user may then manually or automatically choose one of the network connections and have payment information sent to that provider, or have the server indicate that payment has been settled, although not limited thereto. The negotiation of the price and network characteristics (e.g., bandwidth, time, etc.) may be performed by the system.

In one embodiment the network provider may maintain a table of network connection allocations. In this way it can specify maximum resource allocation. When a network connection is offered and payment settled so that the network user is entitled to its use, the network provider may indicate that allocation in its table. The network provider may remove allocations from the table after the time limit, bandwidth limit, etc. are exhausted for the network user's network connection and the network connection is terminated. This way, the network provider may always know which network users are connected, and thus, its liabilities for providing future network connection capabilities.

As discussed above, the price for network connectivity may be at least partly based on current or anticipated network use. In one embodiment, software running on the network provider can determine that if network usage is below 10%, a charge of 1× per connection (e.g., time, bandwidth, etc.) can be levied. If network use is 90%, a charge of 10× per connection and prioritization of traffic can be invoked since the network provider is making the most profit from that connection. It is to be appreciated that these values are exemplary in nature and the present teachings are not limited to any particular embodiment disclosed herein.

The provider may keep a record of all accepted network connections (e.g., contracts, etc.). Thus, if there is an agreement, but the user does not use the connection for a period of time, the user may be able to obtain its already-paid for connection when it wants it. All connections may have an expiration date/time so that the network provider is not indefinitely carrying the liability of an accepted network connection.

In one embodiment, once there is mutual acceptance (e.g., "handshake", etc.), the deal is done and the network user may pay for the connection, regardless of whether it is used. The use of a central server may also provide a record of the deal to prevent either party from backing out of a deal after agreement. The server 60 may note that certain network providers are unreliable, for example, and choose not to negotiate with them in the future. If a network user does not receive a connection/refusal/etc. from a network provider, it can re-poll a provider/all available providers for status, or re-negotiate a deal.

If a central server is used, it may store all of the information and may immediately transfer funds from a user's server account to a provider account. Providers may also want to use the system if their network connection is very busy. In this way, they could act as "reseller" by directing traffic through another provider's bandwidth that they have paid for. The accounts could "settle" at the end of the month, immediately, or any time by transferring income to a bank account, debiting a credit card/bank account, or some other payment system. If they each have accounts, it is quicker to make deals since they will presumably be pre-authorized for a transaction. If no deal is made (e.g., bad credit card info, etc.) the provider can re-poll the user, but may not provide a network connection until the deal is finalized, although not limited thereto.

The system can be completely customizable with respect to counter-offers. For the provider, a counter-offer may be based on current network use, although not limited thereto. For the user, a counter-offer may be based on reliability (e.g., judged by the server, etc.), bandwidth, etc., although not limited thereto. If the server technique is used, each party may have preferences (e.g., "I am willing to pay X", "I can only give Y reliability", etc.) and the server may suggest reasonable counter-offers in order to facilitate a deal. If there are multiple providers as in a preferred embodiment, they will each be competing for the user.

The connection may be a time (e.g., "I need a 5-minute connection") or a size (e.g., "I need to transfer and receive 5 MB of information"), although not limited thereto. After the limit is reached the connection may be stopped and another contract renegotiated, and then possibly terminated. In the alternative, the user (or server, etc.) and provider may also negotiate renewals during the initial negotiation, although not limited thereto. In this way, it is possible to automatically renew if acceptable to both parties. A central server can keep a record of each of the contracts (e.g., agreements, etc.) and payment can be settled immediately on connection. If the user is directly sending payment information (e.g., a credit card number, etc.), the provider can charge the user immediately. The connection acceptance may be in the form of a receipt, although it may not be settled until after the connection is established.

Such a system appreciates the rapid growth of the availability of WIFI networks, for example. Providers of such networks have the desire to derive income from these networks while users desire quality network connections. For example, the provider software could be installed on a wireless router of a retailer or restaurant, and the system could then automatically negotiate network connections and create income for the retailer or restaurant without their active maintenance of the scheme. Instead, a server may maintain connections and manage revenue generation, although not limited thereto.

Single-use/network-provider-independent devices can also benefit from such a system. For example, phone devices that operate on wireless networks and not cellular networks (e.g., APPLE® ITOUCH® device using SKYPE® software, etc.) could be sold with a pre-paid balance on the system. Then they may use the system, which will automatically negotiate lowest-priced network connection as needed. When the balance falls below a predetermined level and is running out, the device may then notify the user that it is time to prepay add more funds to the account.

Single use devices may include, for example, emergency beacons, which when activated may search for a network connection and then transmit a predetermined message and location, for example. Other network independent devices may include plug-in monitoring devices such as, for example, a device that an appliance (e.g., light bulb, refrigerator, etc.) is plugged into, which can then email or otherwise notify a predetermined recipient over the network the status of the appliance (e.g., bulb is out, refrigerator is using too much electricity, etc.). It is appreciated that any number of devices may benefit from the negotiated, network-independent connection scheme described herein and they are not limited to any of the exemplary embodiments described. For example, an automobile may store information about itself and periodically send this information to a predetermined location on a network (e.g., automobile manufacturer, etc.) when it detects (and negotiates) a network connection. The manufacturer may use this information for marketing and or research and development purposes, although not limited thereto.

The system can be implemented to execute on a node in communications network 20 (FIG. 4) or via the Internet. Common forms of computer-readable media can include, but are not limited to, for example, a floppy disk, a flexible disk, a hard disk, magnetic tape, or any other magnetic medium, a CDROM or any other optical medium, punched cards, paper tape, or any other physical medium with patterns of holes or ink or characters, a RAM, a PROM, and EPROM, a FLASH-EPROM, or any other memory chip or cartridge, a carrier wave, or any other medium from which a computer can read.

In one embodiment, a transmission (e.g., data packet, etc.) may contain the information for requesting network connection. In this way, the transmission may negotiate its path as it travels to its destination, negotiating with various network providers along the way.

In another embodiment, payment for a network connection may be in the form of information instead of money. For example, a user may indicate a willingness to accept advertisements or to provide personal information to a provider. The provider may want this information in order to develop targeting marketing campaigns, although not limited thereto.

While the present teachings have been described above in terms of specific embodiments, it is to be understood that they are not limited to these disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A system for negotiating a network connection for the benefit of a user computer, comprising:
    a plurality of network access point computers which are fully automated and are configured to provide access to a computer network, the plurality of network access point computers each associated with a provider service outline; and
    a negotiation processor selecting a selected network access point from the plurality of network access point computers, the selecting being based on a negotiation between the user computer and the plurality of network access point computers using the provider service outlines and a requested service outline, the negotiation being conducted at the same time between the user computer and the plurality of network access point computers, the negotiation involving at least one counter-offer by the user computer, the counter-offer made in response to at least one provider service outline to obtain selected price or network metric in accordance with the requested service outline, the requested service outline being based on service metrics requested by the user computer and comprising one or more of preferred bandwidth, connection time, and network reliability;
    wherein the selected network access point enables the network connection when the selected network access point and the user computer agree on a payment amount for the network connection; and
    the plurality of network access point computers compete to provide network access to the user computer.

2. The system of claim 1 wherein the user computer comprises the negotiation processor.

3. The system of claim 1 further comprising: a server computer in electronic connection with the user computer and the plurality of network access point computers over a network; wherein the server comprises the negotiation processor.

4. The system of claim 3 wherein the server maintains ratings of the plurality of network access point computers, the ratings comprising information on a previous network connection provided by at least one of the plurality of network access point computers to another user computer, the information provided by the another user computer.

5. The system of claim 1 wherein at least one of the plurality of network access point computers comprises a router.

6. The system of claim 1 wherein the computer network is the Internet.

7. The system of claim 1 wherein the requested service outline comprises account information having a prepaid payment amount.

8. The system of claim 1 wherein the requested service outline comprises a unique identifier.

9. The system of claim 1 wherein the provider service outlines each comprise a price.

10. The system of claim 9 wherein the price is based at least in part on current network volume.

11. The system of claim 1 wherein the user computer provides network access to another computer using the network connection.

12. The system of claim 1 further comprising a user interface for managing the requested service outline, wherein the user interface comprises a webpage.

13. A method for negotiating a computer network connection provided for the benefit of a network user computer, the method comprising the steps of:
    receiving, by a plurality of provider processors, each associated with at least one of a plurality of network access points, a network connection preference from the network user computer, the network connection preference comprising one or more of preferred bandwidth, connection time, and network reliability;
    sending, by the plurality of provider processors, an offer for a network connection, each of the offers having a service outline, the plurality of provider processors fully automated and competing to provide network access to the network user computer,
    selecting, by a negotiation processor, a selected network access point from the plurality of provider processors, the selecting based on a negotiation using the service outlines and in accordance with the network connection preference, the negotiation happening at the same time between the plurality of provider processors and the network user computer, the negotiation involving at least one counter-offer by the network user computer made in response to at least one of the service outlines;
    accepting, by the provider processor associated with the selected network access point, payment account information based on the service outline associated with the selected network access point; and
    enabling, by the provider processor associated with the selected network access point, the computer network connection for the network user computer.

14. The method as in claim 13 wherein at least one of the service outlines comprises at least one of bandwidth, time, quality and price.

15. The method as in claim 13 further comprising:
    determining, by the provider processor associated with the selected network access point, if the computer network connection has expired; and
    discontinuing, by the provider processor associated with the selected network access point, the network connection if the network connection has expired.

16. The method of claim 13 wherein the network user computer comprises the negotiation processor.

17. The method of claim 13 further comprising:
    a server computer in electronic connection with the network user computer and the plurality of provider processors over a network;
    wherein the server computer comprises the negotiation processor; and
    wherein the server computer maintains ratings of the plurality of provider processors, the ratings comprising information on a previous computer network connection provided by at least one of the plurality of provider processors to another network user computer, the information provided by the another network user computer.

\* \* \* \* \*